(12) United States Patent
Kawabata et al.

(10) Patent No.: US 8,851,578 B2
(45) Date of Patent: Oct. 7, 2014

(54) ROTARY PUMP DEVICE AND VEHICLE BRAKE CONTROL SYSTEM

(75) Inventors: Tomoaki Kawabata, Takahama (JP); Kunihito Ando, Okazaki (JP)

(73) Assignee: Advics Co., Ltd., Kariya, Aichi-Pref. (JP)

(*) Notice: Subject to any disclaimer, the term of this patent is extended or adjusted under 35 U.S.C. 154(b) by 835 days.

(21) Appl. No.: 12/947,889

(22) Filed: Nov. 17, 2010

(65) Prior Publication Data
US 2011/0116939 A1    May 19, 2011

(30) Foreign Application Priority Data
Nov. 19, 2009  (JP) .................................. 2009-263864

(51) Int. Cl.
| | | |
|---|---|---|
| B60T 13/16 | (2006.01) | |
| F04C 11/00 | (2006.01) | |
| B60T 17/02 | (2006.01) | |
| B60T 8/40 | (2006.01) | |
| F04C 2/10 | (2006.01) | |

(52) U.S. Cl.
CPC ............. B60T 8/4031 (2013.01); F04C 11/001 (2013.01); B60T 17/02 (2013.01); F04C 2/102 (2013.01)
USPC ...................... 303/10; 303/11; 417/47; 417/80

(58) Field of Classification Search
USPC ............................ 303/10, 11; 418/171, 75, 76
See application file for complete search history.

(56) References Cited

U.S. PATENT DOCUMENTS

| | | | | |
|---|---|---|---|---|
| 6,402,266 | B1 * | 6/2002 | Ariki et al. ................. | 303/116.4 |
| 7,124,930 | B2 * | 10/2006 | Ariki et al. ................. | 228/173.4 |
| 7,530,647 | B2 * | 5/2009 | Yamaguchi et al. ....... | 303/116.4 |
| 2003/0031578 | A1 | 2/2003 | Uchiyama et al. | |
| 2005/0191189 | A1 * | 9/2005 | Fuchida et al. ............. | 417/410.1 |
| 2007/0096550 | A1 * | 5/2007 | Yamaguchi et al. ........... | 303/10 |
| 2007/0210641 | A1 * | 9/2007 | Itoh et al. ......................... | 303/11 |
| 2009/0226298 | A1 | 9/2009 | Kajiyama et al. | |
| 2010/0124513 | A1 | 5/2010 | Koizumi et al. | |

FOREIGN PATENT DOCUMENTS

| | | | |
|---|---|---|---|
| JP | 2002-87236 | A | 3/2002 |
| JP | 2007-125929 | A | 5/2007 |
| JP | 2007-263116 | A1 | 10/2007 |
| JP | 2009-215932 | A1 | 9/2009 |
| JP | 2010-121447 | A | 6/2010 |

OTHER PUBLICATIONS

Japanese Office Action (Notice of Official Rejection) dated Jun. 18, 2013, issued by the Japan Patent Office in corresponding Japanese Patent Application No. 2009-263864, and an English Translation of the Japanese Office Action. (9 pgs.).

* cited by examiner

Primary Examiner — Robert A Siconolfi
Assistant Examiner — James Hsiao
(74) Attorney, Agent, or Firm — Buchanan Ingersoll & Rooney P.C.

(57) ABSTRACT

A first and a second rotary pumps are provided in a first pump casing of a pump body, which is inserted into a cylindrical recessed portion of a housing 101. A first outlet port is opened at a first space formed between a bottom surface of the cylindrical recessed portion and an axial forward end surface of the first pump casing, so that discharge pressure of working fluid of the first pump is supplied to the first space. A second outlet port is opened at a second space formed between an axial backward end surface of the first pump casing and an axial forward end surface of a second pump casing, so that discharge pressure of working fluid of the second pump is supplied to the second space.

4 Claims, 6 Drawing Sheets

ROTARY PUMP DEVICE AND VEHICLE BRAKE CONTROL SYSTEM

CROSS REFERENCE TO RELATED APPLICATION

This application is based on Japanese Patent Application No. 2009-263864 filed on Nov. 19, 2009, the disclosure of which is incorporated herein by reference.

FIELD OF THE INVENTION

The present invention relates to a rotary pump device having an internal gear pump, such as a trochoid pump, and a vehicle brake control system incorporating the rotary pump device.

BACKGROUND OF THE INVENTION

A pump device of a rotary type for a vehicle brake control system is known in the art, for example, as disclosed in Japanese Patent Publication No. 2007-125929, according to which a force is generated by a spring member in an axial direction in order not only to restrict a movement of a pump body (in which rotary pumps for two hydraulic systems are accommodated) in the axial direction thereof but also to prevent a pump casing of the pump body from being damaged by internal pressure of brake fluid discharged from the rotary pumps at high pressure. In other words, an elastic force is generated by the spring member so as to bias the pump body in the axial direction, so that the movement of the pump body in the axial direction is restricted and the damage of the pump casing may be prevented.

According to another prior art, for example, as disclosed in Japanese Patent Publication No. 2002-087236, a high pressure fluid passage communicated to a discharge side of a rotary pump is formed in a housing. And a space is formed between a pump body and a bottom surface of a recessed portion of the housing (into which the pump body is inserted), namely a second back pressure chamber (which has a larger diameter than that of a first back pressure chamber formed at an inlet side, and which surrounds the first back pressure chamber formed at an inlet side) is formed at an axial forward end of the pump body. A high pressure of the working fluid is applied to the space, so that a force for biasing the pump body in a direction opposite to an insertion of the pump body is applied to the pump body. As a result, a movement of the pump body in the direction of insertion is restricted and a casing of the pump body is prevented from being damaged.

According to the above prior art (JP 2007-125929), the force for pushing the pump body is obtained by the spring member. Therefore, since such force is applied to the pump body and the housing irrespective of the internal fluid pressure of the pump body, the pump body and the housing should have rigidity enough to resist the spring force. There are some restrictions for parts and components which constitute the pump body in order to achieve the necessary rigidity. There are other restrictions for processes, according to which the pump body should be assembled while a spring force is adjusted.

The force (pressure) for pushing the pump body in its axial direction is decided based on the spring force and fluid pressure generated in the pump device. In a case that fluid pressure for wheel cylinders of only one hydraulic system (among two hydraulic systems) is increased, while the fluid pressure for wheel cylinders of the other hydraulic system is not increased, the high pressure is generated only in the one hydraulic system. Therefore, the force (pressure) for pushing the pump body may be rather small. On the other hand, in a case that the fluid pressure for the wheel cylinders of both of two hydraulic systems is increased, the force (pressure) for pushing the pump body becomes larger. Therefore, it is necessary for the pump body and the housing to have rigidity enough to resist such high pressure.

According to the above other prior art (JP 2002-087236), in which the high pressure is introduced at the axial forward end surface of the pump body, the high pressure is only introduced into the second back pressure chamber (which surrounds the first back pressure chamber of the inlet side). In other words, a surface area of the axial forward end of the pump body to which the high pressure is applied is rather small, and thereby only insufficient pushing force (pressure) may be applied to the pump body. When the pushing force is smaller, a difference may be generated between the pushing force at the outside of the pump body and an internal fluid pressure of the pump body. Then, a deformation of the casing for the pump body may occur, and gaps between parts for forming the casing may be increased. Therefore, there may be a danger of decreasing pump efficiency.

SUMMARY OF THE INVENTION

The present invention is, therefore, made in view of the foregoing problem, and has an object to provide a rotary pump device, in which fluid pressure for pushing a pump body at a proper pressure is generated. It is another object of the present invention to provide a vehicle brake control system incorporating the above rotary pump device.

According to a feature of the invention, a first outlet port is opened to a first axial space which is formed between a bottom surface of a cylindrical recessed portion of a housing and an axial forward end surface of a first pump casing of a pump body (which is inserted into the cylindrical recessed portion), so that discharge pressure of a first rotary pump is introduced into the first axial space. And a second outlet port is opened to a second axial space which is formed between an axial backward end surface of the first pump casing of the pump body and an axial forward end surface of a second pump casing of the pump body, so that discharge pressure of a second rotary pump is introduced into the second axial space.

As above, the discharge pressures (high pressure) of the first and second rotary pumps are, respectively applied to the axial forward and backward end surfaces of the first pump casing, in which the first and second rotary pumps are accommodated. Namely; the high pressure is applied to both of the axial end surfaces of the first pump casing, each of which has a larger surface area. Therefore, it is possible to apply pushing force to the first pump casing in a balanced manner and to hold the first pump casing at its desired position, even when no spring is provided in the pump device or a spring having only a small spring force is provided in the pump device. In addition, since there is no pushing force of a spring or the pushing force is reduced, it is possible for the rotary pump device to generate fluid pressure of a proper value for pushing the pump body.

According to another feature of the invention, a first pump casing of a pump body has a first rotor chamber and a second rotor chamber for respectively accommodating a first rotary pump and a second rotary pump, a first outlet port is formed in the first pump casing to be opened at an axial forward end surface thereof, so that discharge pressure of working fluid from the first rotary pump is applied to the axial forward end surface of the first pump casing, and a second outlet port is formed in the first pump casing to be opened at an axial backward end surface thereof, so that discharge pressure of working fluid from the second rotary pump is applied to the axial backward end surface of the first pump casing.

According to the above feature, the same effect to that of the invention described above can be obtained. In addition, the structure of the pump device for introducing the discharge pressure of the first and second rotary pumps to the axial end surfaces of the first pump casing may become simpler.

According to a further feature of the invention, the first pump casing is movable in a direction of inserting the first pump casing into the cylindrical recessed portion, based on fluid pressure applied to the axial forward end surface of the first pump casing and fluid pressure applied to the axial backward end surface of the first pump casing.

According to the above feature, when one of the first and second rotary pumps is operated, depending on the rotary pump to be operated, the first pump casing is moved either to a position at which the first pump casing is brought into contact with the bottom surface of the cylindrical recessed portion or to another position at which the first pump casing is brought into contact with the axial end surface of the second pump casing. As a result, the axial forward or backward end surface of the first pump casing is pushed by the fluid pressure, which corresponds to the discharge pressure of the first or the second rotary pump, whichever is operated. Therefore, according to the rotary pump device of the invention, the fluid pressure of a proper value is generated for pushing the pump body.

According to a further feature of the invention, a discharge timing of the working fluid of the first rotary pump is displaced from that of the working fluid of the second rotary pump by 180 degrees.

According to the above feature, it is possible to counterbalance pressure pulsation of the brake fluid between the first and second rotary pumps, to thereby decrease the pressure pulsation. More exactly, a timing at which a working chamber of the first rotary pump is communicated with the first outlet port and a timing at which a working chamber of the second rotary pump is communicated with the second outlet port are not at the same timing, but they are displaced from each other by 180 degrees.

According to a still further feature of the invention, the rotary pump device is applied to a vehicle brake control system.

According to the vehicle brake control system, one of the first and second rotary pumps discharges pressurized brake fluid into a part of a first main fluid passage of a first hydraulic circuit between a first differential pressure control valve and first and second pressure increase valves. And the other of the first and second rotary pumps discharges pressurized brake fluid into a part of a second main fluid passage of a second hydraulic circuit between a second differential pressure control valve and third and fourth pressure increase valves.

In the above vehicle brake control system, the second differential pressure control valve as well as the third and fourth pressure increase valves of the second hydraulic circuit (which is a rear wheel hydraulic system) is switched to non-communication mode, when the first and second rotary pumps are operated, in order that the first pump casing is moved in the cylindrical recessed portions in one axial direction of the pump body.

As a result, one of a first axial space formed between a bottom surface of the cylindrical recessed portions and an axial forward end surface of the first pump casing and a second axial space formed between an axial backward end surface of the first pump casing and an axial forward end surface of the second pump casing, which is communicated to the first hydraulic circuit, is reduced in its volume when the first pump casing is moved in the one axial direction, so that a part of the brake fluid is pushed out from the rotary pump device into the first main fluid passage of the first hydraulic circuit.

As above, the first pump casing is at first moved to one of axial end positions in the insertion direction thereof, then the first pump casing is moved from the one axial end position to the other axial end position based on a difference of consuming amount of the brake fluid between the first and second hydraulic circuits. And the pressure increase response for wheel cylinder pressure in one of the hydraulic circuits can be improved by use of the brake fluid, which is pushed out from the pump device because of the movement of the first pump casing in the pump device.

According to a still further feature of the invention, a return spring is provided for biasing and moving the first pump casing in the other direction before the first and second rotary pumps are operated, so that the other of the first and second axial, spaces which is communicated to the second hydraulic circuit is reduced in its volume.

According to the above feature, it is possible to move the first pump casing in the backward direction of the insertion, without operating the rotary pumps as well as the other related valves at the initial checking stage for starting a vehicle engine. In addition, since it is possible to increase the amount of the brake fluid to be used for improving the pressure increase response for the wheel cylinder pressure for the front wheel system, the pressure increase response can be further improved.

According to a still further feature of the invention, the first pump casing has;

a first cylinder having a first center through-hole, through which the driving shaft is inserted;

a first center plate arranged next to the first cylinder and for accommodating the first rotary pump;

a second cylinder arranged next to the first center plate and having a second center through-hole, through which the driving shaft is inserted;

a second center plate arranged next to the second cylinder and for accommodating the second rotary pump; and a third cylinder arranged next to the second center plate and having a third center through-hole, through which the driving shaft is inserted.

In the above rotary pump device, the second cylinder is inserted into the cylindrical recessed portion of the housing and firmly fixed to the housing.

According to the above feature (the second cylinder is firmly fixed to the housing), it is possible to apply the pushing force (pressure) of a desired value to the axial forward and backward end surfaces of the first pump casing, even when no spring is provided in the pump device or a spring having only a small spring force is provided in the pump device.

In addition, since the second cylinder is firmly fixed to the housing in the cylindrical recessed portion thereof, the fluid pressures different (independent) from each other, for example a minimum necessary fluid pressure, may be respectively applied to each of the axial end surfaces of the first pump casing. Namely, the fluid pressure of the first rotary pump which is necessary for the first hydraulic circuit is applied to the axial forward end surface of the first pump casing, while the fluid pressure of the second rotary pump which is necessary for the second hydraulic circuit is applied to the axial backward end surface of the first pump casing. As a result, it becomes possible to, make smaller rigidity required for the housing and so on, and to improve durability thereof.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
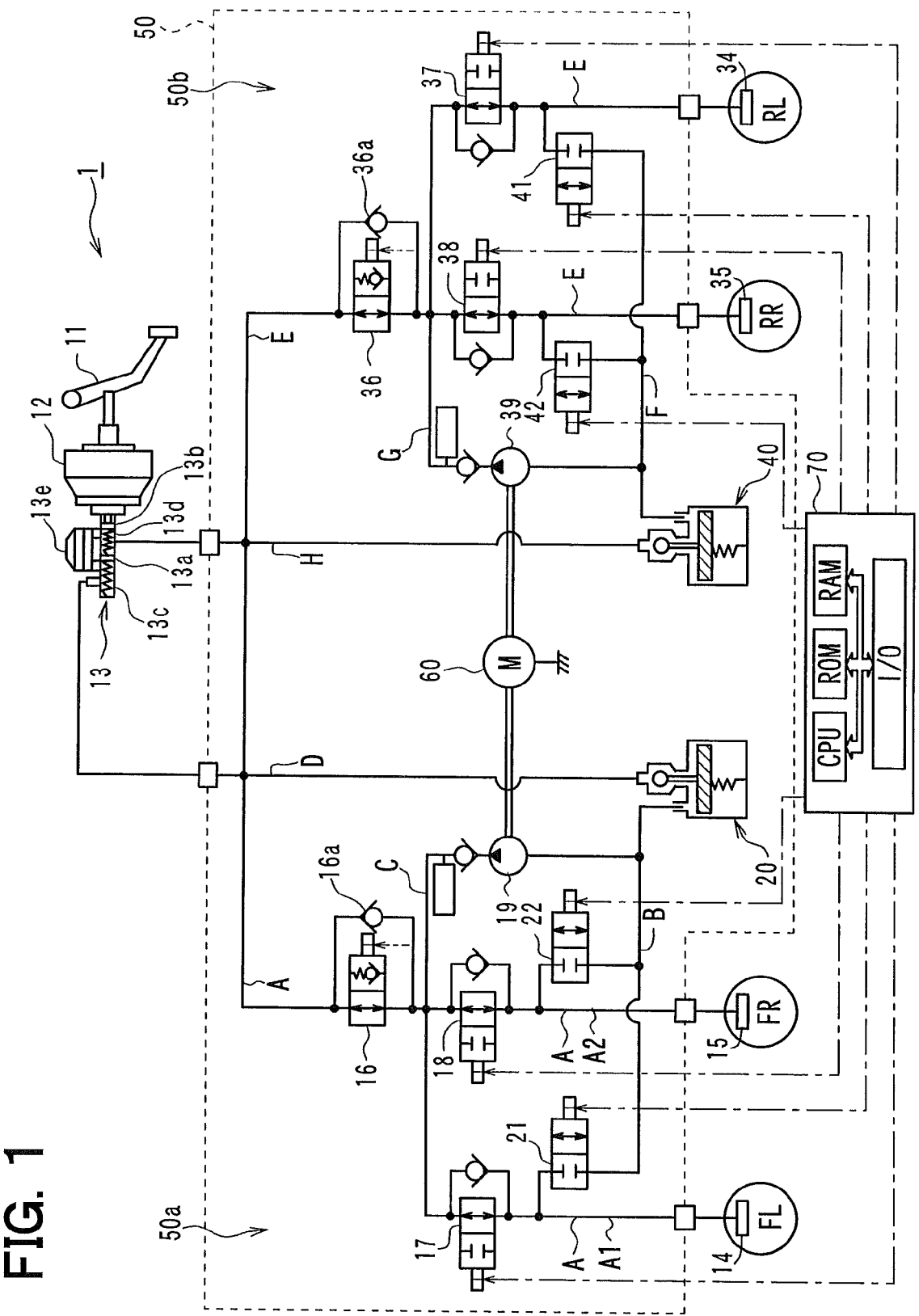
FIG. 1 is a schematic view showing a hydraulic brake system, to which a pump device of a rotary type according to an embodiment of the present invention is applied.

Embodiments of the present invention will be explained with reference to the drawings. The same reference numerals are used throughout the embodiments, when designating the same or similar parts or portions.

FIG. 1 is a schematic view showing a hydraulic brake system of a vehicle brake control system, to which a rotary pump device according to an embodiment of the present invention is applied. A basic structure of the vehicle brake control system will be explained with reference to FIG. 1.

In FIG. 1, an example, in which the vehicle brake control system of the present invention is applied to a four-wheeled vehicle having a front and a rear hydraulic system, will be explained. However, the present invention may be also applied to another type of a hydraulic system, for example, to a cross type (or X-type) system, in which a front-right wheel and a rear-left wheel are controlled by one hydraulic system, while a front-left wheel and a rear-right wheel are controlled by another hydraulic system.

FIG. 1 shows a detailed structure of respective parts and components for a brake control apparatus 1. As shown in FIG. 1, when a brake pedal 11 (which is a part of a brake operating device) is stepped by a vehicle driver, the stepping force is increased by a brake booster 12 to push master pistons 13a and 13b provided in a master cylinder 13. A master cylinder pressure (M/C pressure) is generated in each of a primary chamber 13c and a secondary chamber 13d, which are defined by the master pistons 13a and 13b, wherein the M/C pressures in the primary and secondary chambers 13c and 13d are the same to each other. The M/C pressures are applied to respective wheel cylinders 14, 15, 34, 35 through a hydraulic brake actuator 50 for controlling brake fluid pressure. The master cylinder 13 has a master reservoir 13e, which has fluid passages for communicating the primary and secondary chambers 13c and 13d with each other.

The hydraulic brake actuator 50 has a first hydraulic circuit 50a and a second hydraulic circuit 50b. The first hydraulic circuit 50a controls the brake fluid pressure to be applied to the wheel cylinders 14 and 15 of a front left wheel FL and a front right wheel FR (a front hydraulic system), whereas the second hydraulic circuit 50b controls the brake fluid pressure to be applied to the wheel cylinders 34 and 35 of a rear right wheel RR and a rear left wheel RL (a rear hydraulic system).

Since the first and second hydraulic circuits 50a and 50b have the same structure to each other, an explanation will be made hereinafter only for the first hydraulic circuit 50a. An explanation for the second hydraulic circuit 50b is therefore omitted.

The first hydraulic circuit 50a has a main fluid passage A, through which the M/C pressure of the master cylinder 13 is applied to the wheel cylinder 14 for the front left wheel FL as well as the wheel cylinder 15 for the front right wheel FR, so that the wheel cylinder pressure (W/C pressure) is generated at the respective wheel cylinders.

The main fluid passage A has a first differential pressure control valve 16, which is switched to a communication mode or a differential pressure mode. More exactly, the first differential pressure control valve 16 is switched to the communication mode (namely, a valve position is so adjusted) during a normal braking operation when the brake pedal 11 is pressed by the vehicle driver, in other words, during a vehicle control operation in which no vehicle movement control is carried out.

When electric current is supplied to a solenoid coil provided in the first differential pressure control valve 16, the valve position is so adjusted that a larger pressure difference is generated at the first differential pressure control valve 16 as the electric current becomes larger.

When the first differential pressure control valve 16 is switched to the differential pressure mode, the brake fluid is allowed to flow from a side of the wheel cylinders 14 and 15 to a side of the master cylinder 13, only when the brake fluid pressure at the side of the wheel cylinders 14 and 15 becomes higher than that at the side of the master cylinder 13. As a result, it is so controlled that the brake fluid pressure at the side of the wheel cylinders 14 and 15 may not become higher than that at the side of the master cylinder 13 by more than a predetermined pressure.

The main fluid passage A is branched out to fluid passages A1 and A2 at a downstream side of the first differential pressure control valve 16 (that is, on the side of the wheel cylinders 14 and 15). A first pressure increase valve 17 is provided in the fluid passage A1 for controlling the pressure increase of the brake fluid to the wheel cylinder 14, and a second pressure increase valve 18 is likewise provided in the fluid passage A2 for controlling the pressure increase of the brake fluid to the wheel cylinder 15.

Each of the first and second pressure increase valves 17 and 18 is composed of a 2-position electromagnetic valve, so that each of them is switched to a communication mode or a non-communication mode. More exactly, each of the pressure increase valves 17 and 18 is composed of an electromagnetic valve of a normally opened type, wherein a valve position is switched to the communication mode when no electric current is supplied to a solenoid thereof, while the valve position is switched to the non-communication mode when the electric current is supplied to the solenoid.

A fluid passage B connects each of intermediate points between the first and second pressure increase valves 17 and 18 and the wheel cylinders 14 and 15 with a pressure regulating reservoir 20. A first and a second pressure decrease valve 21 and 22 are respectively provided in the fluid passage B. Each of the pressure decrease valves 21 and 22 is composed of an electromagnetic 2-position valve, wherein a valve position is switched from a communication mode (an opened state) to a non-communication mode (a closed state) and vice versa. And those pressure decrease valves 21 and 22 are normally closed type valves.

A fluid passage C is provided as a fluid return line between the pressure regulating reservoir 20 and the main fluid passage A. A fluid pump (a first rotary pump) 19 driven by an electric motor 60 is provided in the fluid passage C, wherein the pump 19 draws the brake fluid from the pressure regulating reservoir 20 and pumps out pressurized brake fluid to the master cylinder 13 or to the wheel cylinders 14 and 15. The electric motor 60 is operated by controlling current supply to a motor relay (not shown).

A fluid passage D is provided between the pressure regulating reservoir 20 and the master cylinder 13. The pump 19 draws the brake fluid from the master cylinder 13 through the fluid passage D and pumps out the pressurized brake fluid to the main fluid passage A during the vehicle movement control, so that the pump 19 supplies the brake fluid to the side of the wheel cylinders 14 and 15 to thereby increase the W/C pressure at the wheel cylinder 14 and/or 15 to be controlled. As explained above, the second hydraulic circuit 50b has the same parts and components and the same structure to the first hydraulic circuit 50a. More exactly, the second hydraulic circuit 50b has a second differential pressure control valve 36 (corresponding to the first differential pressure control valve 16), a third and fourth pressure increase valves 37 and 38 (corresponding to the first and second pressure increase valves 17 and 18), a third and fourth pressure decrease valves 41 and 42 (corresponding to the first and second pressure decrease valves 21 and 22), a pump (a second rotary pump) 39 (corresponding to the pump 19), a pressure regulating reservoir 40 (corresponding to the pressure regulating reservoir 20), and fluid passages E to H (corresponding to the fluid passages A to D).

A brake control ECU 70 controls an operation of the brake control apparatus 1 and is composed of a well known micro computer having CPU, ROM, RAM and I/O. The ECU 70 carries out processes, such as various calculations for the vehicle movement controls (such as, a vehicle sideslip control and so on) in accordance with programs stored in the ROM and the like.

The ECU 70 calculates various physical values based on detection signals from sensors (not shown) and determines based on the calculated physical values whether the vehicle movement control should be carried out or not. And when it is to be carried out, the ECU 70 calculates a physical value for the wheel cylinder to be controlled, namely the W/C pressure to be generated at the wheel cylinder to be controlled. Based on such calculation, the ECU 70 carries out current supply control to the respective control valves 16 to 18, 21, 22, 36 to 38, 41 and 42 as well as current supply control to the electric motor 60 for driving the pumps 19 and 39. As a result, the W/C pressure at the wheel cylinder to be controlled is controlled to carry out the vehicle movement control.

When no braking pressure is generated at the master cylinder 13, for example, during a traction control, a vehicle sideslip control, and so on, the pumps 19 and 39 are operated and the first and second differential pressure control valves 16 and 36 are switched to the differential pressure mode, so that the brake fluid can be supplied to downstream sides of the first and second differential pressure control valves 16 and 36 (namely to the side of the wheel cylinders 14, 15, 34 and 35) through the fluid passages D and H. The first to fourth pressure increase valves 17, 18, 37 and 38 as well as the first to fourth pressure decrease valves 21, 22, 41 and 42 are properly controlled, to thereby control the pressure increase or pressure decrease at the wheel cylinders to be controlled. As above, the W/C pressure is controlled at a desired value.

During the ABS control, the first to fourth pressure increase valves 17, 18, 37 and 38 as well as the first to fourth pressure decrease valves 21, 22, 41 and 42 are properly controlled, and the pumps 19 and 39 are operated at the same time. As a result, the pressure increase or pressure decrease at the wheel cylinders to be controlled is controlled, and the W/C pressure is controlled at a desired value.

Figure 2:
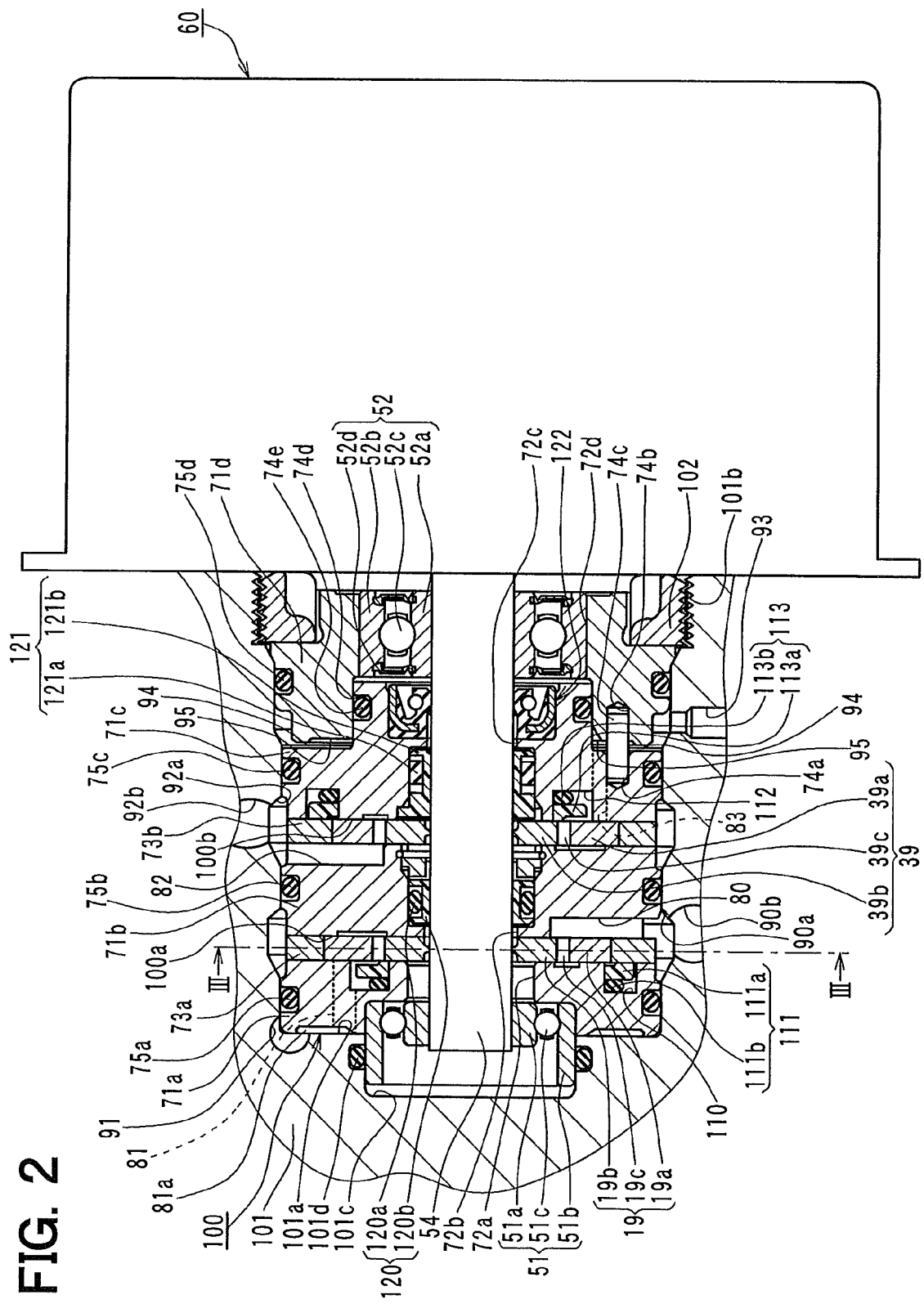
FIG. 2 is a schematic cross sectional view showing the pump device of the rotary type having rotary pumps 19 and 39, a pump body 100 and an electric motor 60.

A structure of a pump device of a rotary type for the vehicle brake control system, namely a structure of the pumps 19 and 39 as well as the electric motor 60 will be explained. FIG. 2 is a schematic cross sectional view showing the pump device of the rotary type having a pump body 100 including the pumps 19 and 39 and the electric motor 60. FIG. 2 shows a condition, in which the pump body 100 is assembled to a housing 101 of the hydraulic brake actuator 50, wherein an upper-down direction in the drawing (FIG. 2) corresponds to a vertical direction of the vehicle.

As already explained above, the vehicle brake control system has the first and second hydraulic circuits 50a and 50b. Therefore, the pump body 100 has the first rotary pump 19 for the first hydraulic circuit 50a and the second rotary pump 39 for the second hydraulic circuit 50b, as shown in FIG. 2.

A driving shaft 54, which is rotatably supported by first and second bearings 51 and 52, is driven by the electric motor 60, so that the rotary pumps 19 and 39 provided in the pump body 100 are operated. A pump casing for constituting an outside of the pump body 100 is composed of a first to a fourth cylinders (side plates) 71a to 71d and a first and a second cylindrical center plates 73a and 73b. The first bearing 51 is arranged in the first cylinder 71a, while the second bearing is arranged in the fourth cylinder 71d.

The first cylinder 71a, the first center plate 73a, the second cylinder 71b, the second center plate 73b and the third cylinder 71c are lapped over one another in this order, and they are lap-welded at their overlapping outer peripheries. Those cylinders and center plates are unitized as a first pump casing. The fourth cylinder 71d is formed as a second pump casing, which is coaxially arranged with the first pump casing, so that the first pump casing and the second pump casing form the casing for the pump body 100. Recessed portions 74a and 74b are formed at each of end surfaces of the third and fourth cylinders 71c and 71d facing to each other. A pin 74c is inserted into the recessed portions 74a and 74b, so that the first and second pump casings are aligned in a rotational direction of the driving shaft 54.

As above, the pump body 100 is integrally formed. And a first cylindrical recessed portion 101a is formed in the housing 101 of the hydraulic brake actuator 50, into which the pump body 100 is inserted in a direction from a right-hand side to a left-hand side in FIG. 2 (hereinafter, this direction will be also referred to as "an insertion, direction" or "a direction of the insertion").

A female screw portion 101b is formed at an entrance of the cylindrical recessed portion 101a (at a right-hand side thereof). A male screw member 102 of a ring shape is screwed into the female screw portion 101b, so that the pump body 100 is fixed to the housing 101. Because of the male screw member 102 being screwed into the female screw portion 101b, the pump body 100 is firmly assembled to the housing 101.

A second cylindrical recessed portion 101c is formed in the housing 101 at a bottom of the first cylindrical recessed portion 101a, that is, at a position facing to a forward end (a left-hand end) of the driving shaft 54. An inner diameter of the second cylindrical recessed portion 101c is substantially the same to an outer diameter of the first bearing 51 outwardly projecting in the insertion direction from the first cylinder 71a, and smaller than the outer diameter of the first cylinder 71a. Therefore, a projecting portion of the first bearing 51 is inserted into the second cylindrical recessed portion 101c. A bottom surface of the first cylindrical recessed portion 101a (except for the second cylindrical recessed portion 101c) faces to and is in contact with an axial forward end surface (a left-hand side surface) of the first cylinder 71a.

Each of the first to fourth cylinders 71a to 71d has a first to a fourth center through-hole 72a to 72d, through which the driving shaft 54 is inserted. The driving shaft 54 is rotatably supported by the first bearing 51 arranged at an inner periphery of the first center through-hole 72a of the first cylinder 71a and by the second bearing 52 arranged at an inner periphery of the fourth center through-hole 72d of the fourth cylinder 71d. Any types of bearings may be used as the first and second bearings 51 and 52. However, according to the present embodiment, a ball bearing with a small width is used.

More exactly, the first bearing 51 has an inner ring 51a, an outer ring 51b and a rolling element 51c. The driving shaft 54 is inserted through the inner ring 51a, so that the driving shaft 54 is rotatably supported. The center through-hole 72a of the first cylinder 71a is enlarged in its diameter at a side of the axial forward end surface (the left-hand side surface) to such a diameter corresponding to the outer diameter of the first bearing 51, so that the first bearing 51 is inserted into such an enlarged portion of the center through-hole 72a and fixed to the first cylinder 71a.

An axial length of the outer ring 51b is made longer than that of the inner ring 51a, so that a part of the outer ring 51b (a left-hand portion thereof) projects in the left-hand direction (the insertion direction) from the left-hand side surface of the first cylinder 71a. As explained above, the projecting portion (the left-hand portion) of the outer ring 51b of the first bearing 51 is inserted into the second cylindrical recessed portion 101c. An O-ring 101d is provided at an inner peripheral wall of the second cylindrical recessed portion 101c, so as to surround an outer peripheral wall of the outer ring 51b.

The second bearing 52 likewise has an inner ring 52a, an outer ring 52b and a rolling element 52c. The outer ring 52b is press inserted into the center through-hole 72d of the fourth cylinder 71d and fixed thereto. The driving shaft 54 is inserted through the inner ring 52a, so that the driving shaft 54 is rotatably supported. However, the driving shaft 54 is loosely supported by the inner ring 52a of the second bearing 52, so that the driving shaft 54 may be moved in an axial direction thereof relative to the second bearing 52. A seal plate 52d is provided at the second bearing 52. Since the second bearing 52 is arranged at a rear side (an axial backward side) of the pump body 100 in the insertion direction, the brake fluid is prevented from leaking out through the second bearing 52.

Figure 3:
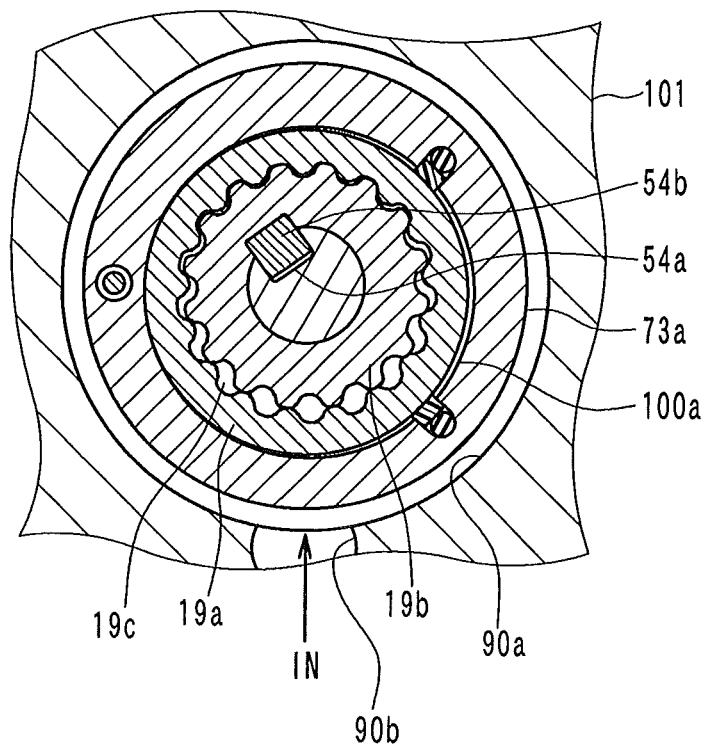
FIG. 3 is a cross sectional view taken along a line in FIG. 2.

The first and second rotary pumps 19 and 39 are arranged in a space surrounded by the first and second bearing 51 and 52. FIG. 3 is a cross sectional view taken along a line in FIG. 2. A detailed structure of the rotary pumps 19 and 39 will be explained.

The rotary pump 19 is arranged in a (first) rotor chamber 100a, which is defined by the first center plate 73a and the first and second cylinders 71a and 72b provided at both sides of the first center plate 73a. The rotary pump 19 is an internal gear pump (a trochoid pump), which is driven by the driving shaft 54 inserted through the rotor chamber 100a.

More exactly, the rotary pump 19 has a rotational portion being composed of an outer rotor 19a and an inner rotor 19b, wherein an inner teeth portion is formed at an inner peripheral surface of the outer rotor 19a, while an outer teeth portion is formed at an outer peripheral surface of the inner, rotor 19b. The driving shaft 54 is inserted through a center through-hole formed at a center of the inner rotor 19b. A key 54b is inserted into a key hole 54a formed in the driving shaft 54, so that torque of the driving shaft 54 is transmitted to the inner rotor 19b through the key 54b.

The outer and inner teeth portions (respectively formed at the outer and inner rotors 19a and 19b) are operatively engaged with each other to form multiple working chambers 19c therebetween, wherein volume of each working chamber 19c is changed (increased and decreased) in accordance with the rotation of the driving shaft 54, so that the brake fluid is drawn into the working chamber 19c and then pumped out from the working chamber 19c.

The rotary pump 39 is likewise arranged in a (second) rotor chamber 100b, which is defined by the second center plate 73b and the second and third cylinders 71b and 72c provided at both sides of the second center plate 73b. The rotary pump 39 is driven by the driving shaft 54 inserted through the rotor chamber 100b. Like the pump 19, the pump 39 has a rotational portion being composed of an outer rotor 39a and an inner rotor 39b, wherein an inner teeth portion is formed at an inner peripheral surface of the outer rotor 39a, while an outer teeth portion is formed at an outer peripheral surface of the inner rotor 39b. The pump 39 is also formed as the internal gear pump, so that the outer and inner teeth portions are operatively engaged with each other to form multiple working chambers 39c therebetween to draw and pump out the brake fluid. The pump 39 is arranged in the rotor chamber 100b at such a position that the pump 19 is rotated (displaced) by 180 degrees around the driving shaft 54.

According to such an arrangement, the working chamber 19c in a suction phase and the working chamber 19c in a discharging phase may be respectively symmetric to the working chambers 39c in the suction and discharging phases with respect to the driving shaft 54. As a result, high pressure of the brake fluid applied to the driving shaft 54 on a fluid discharging side may be counterbalanced between the pumps 19 and 39.

In the present embodiment, the above fact that the pump 39 is displaced by 180 degrees from the pump 19 in a rotational direction of the driving shaft 54 does not necessarily mean that an inlet port and an outlet port are exactly arranged at opposite sides in each of the pumps 19 and 39. Rather, a phase of discharging timing for the pump 19 is displaced from a phase of discharging timing for the pump 39 by 180 degrees. In other words, a timing at which the working chamber 19c of the pump 19 is communicated with the outlet port (an outlet port 81 explained below) and a timing at which the working chamber 39c of the pump 39 is communicated with the outlet port (an outlet port 83 explained below) are not at the same timing, but they are displaced from each other by 180 degrees. According to such a structure, it is possible to counterbalance pressure pulsation of the brake fluid between the pumps 19 and 39, to thereby decrease the pressure pulsation.

An inlet port (a first inlet port) 80 is formed in the second cylinder 71b, so that the inlet port 80 is communicated to the working chamber 19c of the pump 19 in the suction phase. The inlet port 80 is formed at the end surface (the left-hand surface) of the second cylinder 71b. The inlet port 80 extends in a radial direction and terminates at an outer peripheral wall of the second cylinder 71b. An annular groove (a first annular groove) 90a is formed in the housing 101 at an inner peripheral wall of the first cylindrical recessed portion 101a. A suction passage (a first suction passage) 90b is formed in the housing 101 and connected to the annular groove 90a. The inlet port 80 opening at the outer peripheral wall of the second cylinder 71b is communicated with the annular groove 90a. As a result, the brake fluid is supplied into the pump 19 from an outside of the pump body 100 via the suction passage 90b, the annular groove 90a and the inlet port 80.

An outlet port (a first outlet port) 81 is formed in the first cylinder 71a, so that the outlet port 81 is communicated to the working chamber 19c of the pump 19 in the discharging phase. The outlet port 81 is formed in the first cylinder 71a in such a way that it extends from one axial end surface (the right-hand surface) of the first cylinder 71a, which faces to the pump 19, to the other axial end surface (the left-hand surface) of the first cylinder 71a. A discharge passage 91 is formed in the housing 101 at the bottom surface of the first cylindrical recessed portion 101a. The outlet port 81 is connected to the discharge passage 91. As a result, the brake fluid is pumped out from the pump 19 (from the bottom portion of the first cylindrical recessed portion 101a of the pump body 100) via the outlet port 81 and the discharge passage 91. More detailed structure of the outlet port 81 will be further explained below.

The outlet port 81 includes an annular groove 110 formed at the axial end surface (the right-hand surface) of the first cylinder 71a, that is a side facing to the rotational portion of the pump 19. The annular groove 110 surrounds the driving shaft 54.

More exactly, a seal member 111 of a ring shape is provided in the annular groove 110, wherein the seal member 111 is pressed against axial end surfaces (left-hand surfaces) of the outer rotor 19a and the inner rotor 19b. The seal member 111 is composed of a ring member 111a made of resin and arranged at a side to the rotational portion of the pump 19 and a rubber member 111b for pushing the ring member 111a toward the rotational portion of the pump 19. An inside area surrounded by the seal member 111 (on a plane equal to an axial backward end surface of the first cylinder 71a) faces to the working chamber 19c in the suction phase and a gap formed between an outer peripheral portion of the outer rotor 19a and an inner peripheral wall of the first center plate 73a, wherein the gap is formed in a radial direction on a side of not the working chamber 19a in the discharging phase but the working chamber 19a in the suction phase. On the other hand, an outside area of the seal member 111 faces (on the plane equal to the axial backward end surface of the first cylinder 71a) to the working chamber 19c in the discharging phase and another gap formed between the outer peripheral portion of the outer rotor 19a and the inner peripheral wall of the first center plate 73a, wherein the other gap is formed in the radial direction on a side of the working chamber 19c in the discharging phase. In other words, the seal member 111 separates in a fluid sealing manner a lower pressure space (the inside area surrounded by the seal member 111) from a higher pressure space (the outside area of the seal member 111).

The seal member 111 is in contact with a radially inner peripheral surface of the annular groove 110, while only a portion of the seal member 111 is in contact with a radially outer peripheral surface of the annular groove 110. In other words, there is an annular space between the seal member 111 and the radially outer peripheral surface of the annular groove 110, so that the brake fluid may flow through such annular space. Thus, the outlet port 81 is composed of the straight passage formed in the first cylinder 71a extending in the axial direction thereof and the annular space formed in the annular groove 110.

In addition, an annular passage 81a is formed at the axial forward end surface (left-hand surface, i.e. a forward end surface in the insertion direction) of the first cylinder 71a, in order to communicate the outlet port 81 with the discharge passage 91. The annular passage 81a is so formed that it surrounds a whole outer periphery of the first bearing 51. Even in the case that a position of the discharge passage 91 is misaligned, the outlet port 81 is surely communicated to the discharge passage 91 through the annular passage 81a. When the axial forward end surface of the first cylinder 71a is brought into contact with the bottom surface of the first cylindrical recessed portion 101a, a gap between them may be eliminated and thereby there is a danger that the outlet port 81 may not be communicated to the discharge passage 91. However, due to the annular passage 81a of the present embodiment, the outlet port 81 can be always communicated to the discharge passage 91.

In addition, a second inlet port 82 is likewise formed in the second cylinder 71b at the axial backward end surface opposite to the axial forward end surface of the first inlet port 80, so that the second inlet port 82 is communicated to the working chamber 39c of the pump 39 in the suction phase. The second inlet port 82 is formed at the axial backward end surface of the second cylinder 71b (the right-hand surface, that is, the side facing to the pump 39). The second inlet port 82 extends in a radial direction and terminates at the outer peripheral wall of the second cylinder 71b. A second annular groove 92a is formed in the housing 101 at the inner peripheral wall of the first cylindrical recessed portion 101a. A second suction passage 92b is formed in the housing 101 and connected to the second annular groove 92a. The second inlet port 82 opening at the outer peripheral wall of the second cylinder 71b is communicated with the second annular groove 92a. As a result, the brake fluid is supplied into the pump 39 from the outside of the pump body 100 via the second suction passage 92b, the second annular groove 92a and the second inlet port 82.

A second outlet port 83 is formed in the third cylinder 71c, so that the second outlet port 83 is communicated to the working chamber 39c of the pump 39 in the discharging phase. The second outlet port 83 is formed in the third cylinder 71c in such a way that it extends from one axial end surface (the left-hand surface) of the third cylinder 71c, which faces to the pump 39, to the other axial end surface (the right-hand surface) of the third cylinder 71c. A second discharge passage 93 is formed in the housing 101, wherein the second discharge passage 93 is opened to an inner peripheral surface of the first cylindrical recessed portion 101a. A space 94 is formed between the third cylinder 71c and the fourth cylinder 71d. The second outlet port 83 is communicated to the second discharge passage 93 through the space 94. As a result, the brake fluid is pumped out from the pump 39 (from an outer peripheral portion of the pump body 100) via the second outlet port 83, the space 94 and the second, discharge passage 93. More detailed structure of the second outlet port 83 will be further explained below.

The second outlet port 83 includes a second annular groove 112 formed at the axial forward end surface (the left-hand surface) of the third cylinder 71c, that is a side facing to the rotational portion of the pump 39. The second annular groove 112 surrounds the driving shaft 54.

More exactly, a second seal member 113 of a ring shape is provided in the second annular groove 112, in such a manner that the second seal member 113 straddles the outer rotor 39a and the inner rotor 39b. The second seal member 113 is composed of a ring member 113a made of resin and arranged at a side to the rotational portion of the pump 39 and a rubber member 113b for pushing the ring member 113a toward the rotational portion of the pump 39. An inside area surrounded by the second seal member 113 (on a plane equal to the axial forward end surface of the third cylinder 71c) faces to the working chamber 39c in the suction phase and a gap formed between an outer peripheral portion of the outer rotor 39a and an inner peripheral wall of the second center plate 73b, wherein the gap is formed in the radial direction on a side of not the working chamber 39a in the discharging phase but the working chamber 39a in the suction phase. On the other hand, an outside area of the second seal member 113 faces (on the plane equal to the axial forward end surface of the third cylinder 71c) to the working chamber 39c in the discharging phase and another gap formed between the outer peripheral portion of the outer rotor 39a and the inner peripheral wall of the second center plate 73b, wherein the other gap is formed in the radial direction on a side of the working chamber 39c in the discharging phase. As above, the second seal member 113 separates in a fluid sealing manner a lower pressure space (the inside area of the second seal member 113) from a higher pressure space (the outside area of the second seal member 113).

The second seal member 113 is in contact with a radially inner peripheral surface of the second annular groove 112, while only a portion of the second seal member 113 is in contact with a radially outer peripheral surface of the second annular groove 112. In other words, there is an annular space between the second seal member 113 and the radially outer peripheral surface of the second annular groove 112, so that the brake fluid may flow through such annular space. Thus, the second outlet port 83 is composed of the straight passage formed in the third cylinder 71c extending in the axial direction thereof, the space 94, and the annular space formed in the second annular groove 112.

In FIG. 2, the suction passage 90b and the discharge passage 91 correspond to the fluid passage C in FIG. 1, while the second suction passage 92b and the second discharge passage 93 correspond to the fluid passage G in FIG. 1.

A diameter of the second center through-hole 72b of the second cylinder 71b, more exactly, a diameter of a portion thereof on the right-hand side, is made larger, than that of the other portion on the left-hand side and larger than an outer diameter of the driving shaft 54. The portion is also referred to as a large-diameter portion. A seal member 120 is accommodated in the large-diameter portion so as to seal the pumps 19 and 39 from each other. The seal member 120 has a ring member 120b made of resin and an O-ring 120a, which is inserted into an annular groove formed in the ring member 120b. More exactly, the annular groove has a U-shaped cross section having a bottom at a radially inner periphery, and the annular groove is opened in a radial outward direction. The ring member 120b is pushed toward the driving shaft 54 by elastic force of the O-ring 120a, so that the ring member 120b is in contact with the driving shaft 54.

In a similar manner to the above seal member 120 provided in the second cylinder 71b, a diameter of the third center through-hole 72c of the third cylinder 71c, more exactly, a diameter of a portion thereof on the left-hand side, is made larger than that of the other portion and the outer diameter of the driving shaft 54. A seal member 121 is accommodated in the large-diameter portion so as to seal the pump 39 from the outside of the housing 101. The seal member 121 has a ring member 121b made of resin and an elastic ring 121a made of rubber, which is inserted into an annular groove formed in the ring member 121b. The annular groove has a U-shaped cross section having a bottom at a radially inner periphery, and the annular groove is opened in a radial outward direction. The ring member 121b is pushed toward the driving shaft 54 by elastic force of the elastic ring 121a, so that the ring member 121b is in contact with the driving shaft 54.

In addition, another large-diameter portion is formed on the right-hand side of the third cylinder 71c (on a side to the electric motor 60), opposite to the seal member 121, and an oil seal member 122 is provided in the other large-diameter portion.

According to the above structure, the leakage of the brake fluid to the outside through the center through-hole 72c is basically prevented by the seal member 121. The oil seal member 122 further ensures the prevention of the leakage of the brake fluid.

Furthermore, a small-diameter portion is formed in the third cylinder 71c on the right-hand side (on the side facing to the fourth cylinder 71d), namely an outer diameter of the third cylinder 71c is made smaller than the inner diameter of the first cylindrical recessed portion 101a and such small-diameter portion is inserted into the center through-hole 72d of the fourth cylinder 71d. An annular groove 74d is formed at an outer peripheral surface of the small-diameter portion, which is inserted into the center through-hole 72d of the fourth cylinder 71d. An O-ring 74e is inserted into the annular groove 74d, so that the O-ring 74e prevents the brake fluid from leaking to the second bearing 52 through a gap between the third cylinder 71c and the fourth cylinder 71d.

As explained above, the small-diameter portion formed in the third cylinder 71c on the right-hand side is inserted into the center through-hole 72d of the fourth cylinder 71d, so that an axial end surface of the third cylinder 71c (on the right-hand side thereof) is brought into contact with an axial end surface of the fourth cylinder 71d (on the left-hand side thereof). An annular groove 95 is formed at either one of the axial end surfaces of the third and fourth cylinders 71c and 71d, so that the second outlet port 83 is communicated to the annular groove 95. As a result, the space 94 is formed between the axial end surfaces of the third and fourth cylinders 71c and 71d, even when both of the axial end surfaces are brought into contact with each other. According to such structure, the fluid pressure discharged from the rotary pump 39 is applied to almost all of the axial backward end surface of the third cylinder 71c, which surrounds the driving shaft 54 in its circumferential direction.

The above structure (the annular groove 95) is not always necessary to the invention. As an alternative structure, an axial length of the small-diameter portion formed in the third cylinder 71c at its axial backward side (at the right-hand side) may be made longer than an axial length of an accommodating space formed in the center through-hole 72d of the fourth cylinder 71d. According to such a structure, when the first pump casing is moved in the right-hand direction, an axial end (a right-hand end) of the small-diameter portion of the third cylinder 71c is brought into contact with a stepped portion formed at an inner peripheral wall of the center through-hole 72d of the fourth cylinder 71d. As above, the movement of the first pump casing in the right-hand direction is restricted.

As above, the brake fluid discharged from the second outlet port 83 of the rotary pump 39 flows into the second discharge passage 93 through the space 94, which is formed between the axial end surfaces of the third and fourth cylinders 71c and 71d.

O-rings 75a to 75d are arranged at each outer peripheral surface of the first to fourth cylinders 71a to 71d. The O-rings 75a to 75d seal the brake fluid in the suction passages 90b and 92b as well as the discharge passages 91 and 93, each of which is formed in the housing 101. The O-ring 75a is arranged between the suction passage 90b and the discharge passage 91, the O-ring 75b is arranged between the suction passage 90b and the suction passage 92b, the O-ring 75c is arranged between the suction passage 92b and the discharge passage 93, and the O-ring 75d is arranged between the discharge passage 93 and the outside of the housing 101.

Contacting forces between the O-rings 75a to 75d and the cylindrical recessed portion 101a of the housing 101 are designed to be such a value that the first pump casing (which is composed of the first to third cylinders 71a to 71c as well as the first and second center plates 73a and 73b) may move together with the driving shaft 54 in the axial direction. Although not shown in FIG. 2, the driving shaft 54 may be coupled to an output shaft (a motor shaft) of the electric motor 60 by means of a coupling mechanism, according to which each axial end of the driving shaft 54 and the motor shaft to be coupled together is formed in a semi-circular shape. As a result, not only the rotation of the motor shaft is transmitted to the driving shaft 54, but also the driving shaft 54 may be moved in the axial direction relative to the motor shaft.

A stepped portion is formed in the fourth cylinder 71d at the right-hand side thereof, so that an outer diameter of the stepped portion is made smaller than the outer diameter of the fourth cylinder 71d. The male screw member 102 of the ring shape is attached to the small-diameter stepped portion, so that the pump body 100 is firmly assembled in the housing 101. A tapered portion is formed at the outer peripheral surface of the fourth cylinder 71d on the side to the electric motor 60, so that the outer diameter of the tapered portion is gradually increased in the direction to the electric motor 60. As a result, when the fourth cylinder 71d is pushed in the leftward direction by the male screw member 102, a tapered surface of the tapered portion is pushed to a tapered surface formed at the cylindrical recessed portion 101a of the housing 101. Therefore, even when the driving shaft 54 is rotated, the fourth cylinder 71d is not rotated together.

According to the above-structured pump body 100, the driving shaft 54 is rotated by the motor shaft of the electric motor 60, so that the pumps 19 and 39 provided in the pump body 100 carry out pumping operation, such as drawing and pumping out the brake fluid. As a result, the vehicle movement control is performed by the vehicle brake control system.

When the vehicle movement control, such as a vehicle roll suppressing control, the traction control, the ABS control, and so on, is carried out by the ECU 70, the electric motor 60 is operated to drive the pumps 19 and 39. When the pumps 19 and 39 are driven in the pump body 100, the basic pumping operation is carried out. Namely, the pumps 19 and 39 draw the brake fluid through the suction passages 90a and 92a and pump out the brake fluid through the discharge passages 91 and 93. The brake fluid is sucked from the reservoirs 20 and 40 and discharged into the fluid passages A and E.

In the case that no M/C pressure is generated in the master cylinder 13, for example, in the vehicle roll suppressing control or the traction control, the brake fluid is sucked by the pumps 19 and 39 from the fluid passages D and H and discharged into the fluid passages A and E, so that brake fluid pressure at the wheel cylinders 14, 15, 34 and 35 can be increased. On the other hand, in the case that the excessive brake fluid pressure (which may cause a locked condition at the wheels) is generated at the wheel cylinders 14, 15, 34 and 35, for example, in the ABS control, the brake fluid is released into the reservoirs 20 and 40 through the fluid passages B and F. The brake fluid is sucked by the pumps 19 and 39 from the reservoirs 20 and 40, so that the reservoirs 20 and 40 may not be fully filled with the brake fluid, and that the brake fluid pressure (W/C pressure) is controlled (increased/decreased) so as to keep a wheel slip ratio at a proper value. The vehicle brake control system, as well as the pumps 19 and 39 is operated in the above manner.

According to the vehicle brake control system incorporating the above explained pump device having the rotary pumps 19 and 39, the first outlet port 81 is formed in the first pump casing (which is composed of the first to third cylinders 71a to 71c as well as the first and second center plates 73a and 73b) in such a manner that the first outlet port is opened at the axial forward end surface thereof (at the axial forward end (the left-hand side) surface), while the second outlet port 83 is likewise formed in the first pump casing so as to open at the axial backward end (the right-hand side) surface thereof. As a result, when the rotary pump 19 is operated, the high pressure of the brake fluid is applied to the axial forward end surface of the first pump casing through the first outlet port 81, while when the rotary pump 39 is operated, the high pressure of the brake fluid is applied to the axial backward end surface of the first pump casing through the second outlet port 83.

Figure 4A:
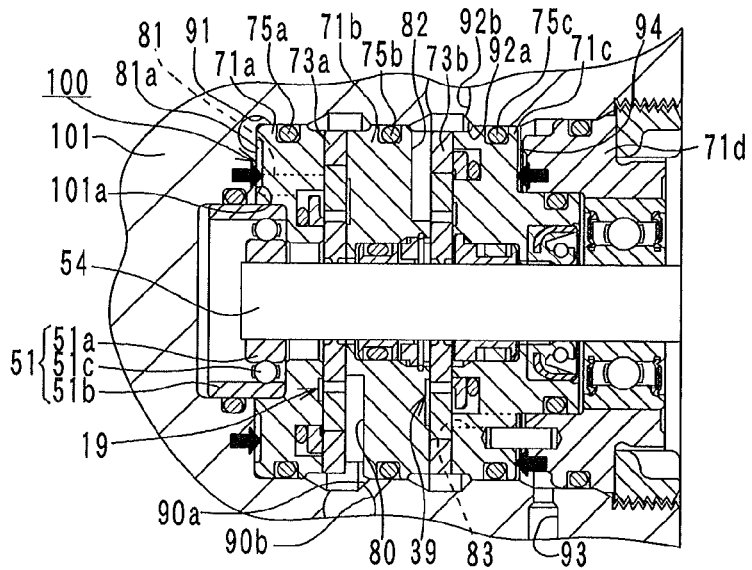
FIGS. 4A to 4C are schematic views showing pressures applied to the pump body.
Figure 4B:
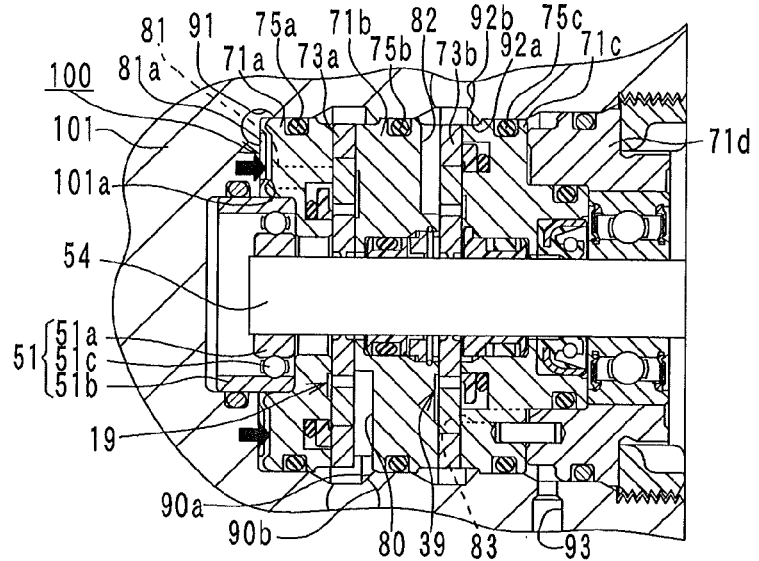
Figure 4C:
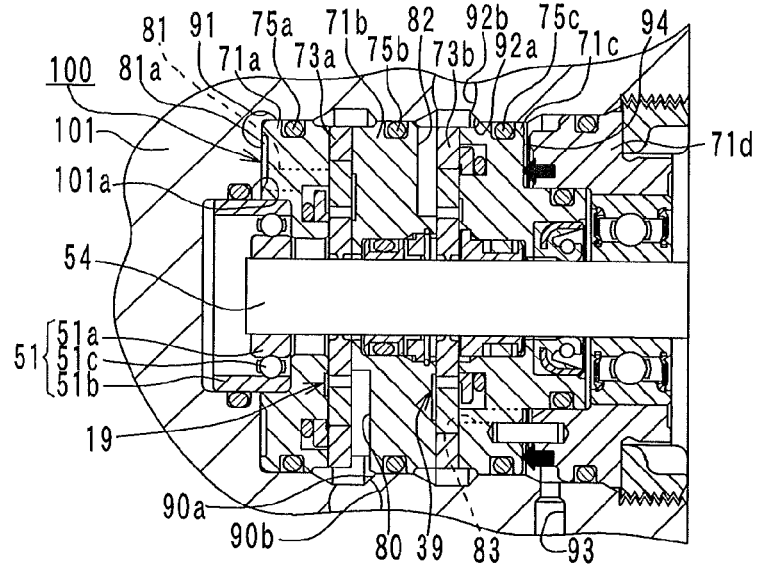

The fluid pressure generated in and applied to the rotary pump device depends on the first or second hydraulic circuit 50a or 50b, at which the high pressure should be generated in accordance with the following cases (1) to (3). FIGS. 4A to 4C are schematic views showing pressures applied to the rotary pump device. Explanation is further made with reference to the drawings of FIGS. 4A to 4C.

(1) In a case that the high pressure of the brake fluid is applied to the wheel cylinders 14, 15, 34 and 35 of both of the first and second hydraulic circuits 50a and 50b, the fluid pressure in each of the first and second discharge passages 91 and 93 communicated to the first and second outlet ports 81 and 83 of the rotary pumps 19 and 39 is increased to the high pressure. Accordingly, the high pressure of the brake fluid is applied to both of the axial end surfaces of the first pump casing, wherein each of the axial ends has a larger area. As indicated by arrows in FIG. 4A, the high pressures of the brake fluid are applied to both of the axial end surfaces of the first pump casing, in such a way that the high pressures are opposed to each other in the axial direction to push the first pump casing from the both axial ends. Therefore, it is possible to hold the first pump casing at its desired position, even when no spring is provided in the pump device or a spring having only a small spring force is provided in the pump device.

In addition, the high pressure of the brake fluid applied to the both axial end surfaces of the first pump casing corresponds to the fluid pressure generated at each of the pumps 19 and 39 provided in the first pump casing (more exactly, the fluid pressure whichever is higher than the other between the pumps 19 and 39). It is possible to maintain a pressure balance between the inside and outside of the first pump casing. Therefore, it is possible to avoid such a situation that the fluid pressure pushing the first pump casing is too small or on the contrary too large. It is possible to provide the rotary pump device, in which the fluid pressure for pushing the pump body 100 at a proper pressure is generated.

(2) In a case that the high pressure of the brake fluid is only applied to the wheel cylinders 14 and 15 of the first hydraulic circuit 50a, while no pressure of the brake fluid is applied to the wheel cylinders 34 and 35 of the second hydraulic circuit 50b, the fluid pressure in the first discharge passage 91 communicated to the first outlet port 81 of the rotary pump 19 is increased to the high pressure, while the fluid pressure in the second discharge passage 93 communicated to the second outlet port 83 of the rotary pump 39 is not increased to the high pressure. In this case, the brake fluid pressure applied to the axial forward end surface of the first pump casing is higher than that applied to the axial backward end surface of the first pump casing. As a result, the first pump casing is axially moved together with the driving shaft 54 in the right-hand direction and thereby the axial backward end surface of the first pump casing is brought into contact with the axial forward end surface of the fourth cylinder 71d (that is, the second pump casing). As indicated by an arrow in FIG. 4B, the brake fluid pressure is applied to the axial forward end surface of the first pump casing as the pushing force, so that the first pump casing is pushed in the right-hand direction.

In the above case, the high pressure of the brake fluid is only applied to the wheel cylinders 14 and 15 of the first hydraulic circuit 50a, while no pressure of the brake fluid is applied to the wheel cylinders 34 and 35 of the second hydraulic circuit 50b. This is achieved, for example, in the following manner. The first to fourth pressure decrease valves 21, 22, 41, 42 are closed, the opening degree of the first differential pressure control valve 16 is made to become a minimum amount (that is, a condition of a maximum differential pressure), and the opening degree of the second differential pressure control valve 36 is made to become a maximum amount (that is, a fully opened condition), and then the electric motor 60 is operated.

In the above case, the brake fluid pressure applied to the first pump casing in the right-hand direction corresponds to the high pressure of the brake fluid generated at the pump 19. It is also possible to maintain the pressure balance between the inside and outside of the first pump casing. In addition, since the first pump casing is pushed by the fluid pressure, which corresponds to the high pressure of the brake fluid generated at the pump 19, the first pump casing may not be pushed by an excessive high pressure.

(3) In a case that the high pressure of the brake fluid is only applied to the wheel cylinders 34 and 35 of the second hydraulic circuit 50b, while no pressure of the brake fluid is applied to the wheel cylinders 14 and 15 of the first hydraulic circuit 50a (this is achieved in a similar manner to that explained for the above case (2)), the fluid pressure in the second discharge passage 93 communicated to the second outlet port 83 of the rotary pump 39 is increased to the high pressure, while the fluid pressure in the first discharge passage 91 communicated to the first outlet port 81 of the rotary pump 19 is not increased to the high pressure. In this case, the brake fluid pressure applied to the axial backward end surface of the first pump casing is higher than that applied to the axial forward end surface of the first pump casing. As a result, the first pump casing is axially moved together with the driving shaft 54 in the left-hand direction and thereby the axial forward end surface of the first pump casing is brought into contact with the bottom surface of the cylindrical recessed portion 101a. As indicated by an arrow in FIG. 4C, the brake fluid pressure is applied to the axial backward end surface of the first pump casing as the pushing force, so that the first pump casing is pushed in the left-hand direction.

In the above case, the brake fluid pressure applied to the first pump casing in the left-hand direction corresponds to the high pressure of the brake fluid generated at the pump 39. It is also possible to maintain the pressure balance between the inside and outside of the first pump casing. In addition, since the first pump casing is pushed by the fluid pressure, which corresponds to the high pressure of the brake fluid generated at the pump 39, the first pump casing may not be pushed by an excessive high pressure.

According to the rotary pump device of the present embodiment, the first and second outlet ports 81 and 83 are opened at the axial forward and backward end surfaces of the first pump casing, which accommodates the rotary pumps 19 and 39, and thereby the high pressure of the brake fluid is applied to such axial end surfaces. In other words, the high pressure of the brake fluid is applied to the axial end surfaces having the large surface area. As a result, it is possible to hold the first pump casing at its desired position under a condition that a predetermined pushing force is applied to the first pump casing, even when no spring is provided in the pump device or the spring having only the small spring force is provided in the pump device. In addition, since the pushing force is not generated by the spring, it is possible to provide the rotary pump device, in which the pushing force of the appropriate value can be generated to the pump body 100. Accordingly, it is possible to make the rotary pump device smaller in its axial direction and/or suppress the pump device from becoming larger in size or heavier in weight due to increase of rigidity of the pump body 100 and/or the housing 101.

The first pump casing for accommodating the rotary pumps 19 and 39 is movable in the insertion direction (in the axial direction of the pump device). Therefore, in the case that the high pressure of the brake fluid is applied only to the wheel cylinders of one of the hydraulic circuits 50a and 50b (which is achieved in the manner already explained above), the first pump casing is moved by the fluid pressure generated by the pump 19 or 39 in the forward or backward direction until either one of the axial end surfaces of the first pump casing is brought into contact with the bottom surface of the cylindrical recessed portion 101a or the axial forward end surface of the fourth cylinder 71d. Namely, the first pump casing is pushed by the fluid pressure, which corresponds to the high-pressure of the brake fluid generated at the pump 19 or 39 (more exactly, the fluid pressure whichever is higher than the other between the pumps 19 and 39) which is operated to increase the fluid pressure in the hydraulic circuit 50a or 50b. It is, therefore, also possible to provide the rotary pump device, in which the pushing force of the appropriate value can be generated to the pump body 100, even in the case that the brake fluid pressure for the wheel cylinders of only one of the hydraulic circuits 50a and 50b is increased.

In addition, according to the present embodiment, the phase for the fluid discharge timing between the rotary pumps 19 and 39 is displaced by 180 degrees from each other. In other words, the timing at which the working chamber 19c is communicated to the first outlet port 81 is not the same to the timing at which the working chamber 39c is communicated to the second outlet port 83, and the timing is displaced by 180 degrees. It is thereby possible to counterbalance the pressure pulsation of the brake fluid in the pump body 100 between the pumps 19 and 39, to thereby decrease the pressure pulsation.

According to the present embodiment, in which the first pump casing is movable in the insertion direction, the first pump casing is brought into contact with the bottom surface of the cylindrical recessed portion 101a or the axial forward end surface of the fourth cylinder 71d, when the brake fluid pressure is increased for the wheel cylinders of either one of the hydraulic circuit 50a or 50b. The pushing force is applied to the first pump casing from both axial ends thereof, in a similar manner to the case when the brake fluid pressure is increased for the wheel cylinders of both of the hydraulic circuits 50a and 50b (the high pressure is applied to both axial end surfaces of the first pump casing). Therefore, even when the first to third cylinders 71a to 71c as well as the first and second center plates 73a and 73b are not integrated by welding, it is possible to prevent the brake fluid from leaking through gaps between them.

(Second Embodiment)

A second embodiment of the present invention will be explained. A vehicle brake control system, to which a rotary pump device according to the present embodiment is applied, is similar to the vehicle brake control system of the first embodiment. Namely, a part of the rotary pump device shown in FIG. 2 is modified. Such modified portions will be explained with reference to FIG. 2.

According to the rotary pump device of the second embodiment, the outer peripheral portion of the second cylinder 71b is fixed to the inner peripheral surface of the cylindrical recessed portion 101a of the housing 101 by means of adhesive material, press insertion, and so on. The other portions are the same to the first embodiment.

The rotary pump device of the above structure operates basically in the same manner to the first embodiment. Since the second cylinder 71b is firmly fixed to the housing 101, the first pump casing (which is composed of the first to third cylinders 71a to 71c as well as the first and second center plates 73a and 73b) may not move in the insertion direction (in the axial direction of the pump device). Fluid pressure generated in the pump device is applied in the following manners.

(1) In a case that the high pressure of the brake fluid is applied to the wheel cylinders 14, 15, 34 and 35 of both of the first and second hydraulic circuits 50a and 50b, the fluid pressure in each of the first and second discharge passages 91 and 93 communicated to the first and second outlet ports 81 and 83 of the rotary pumps 19 and 39 is increased to the high pressure. Accordingly, the high pressure of the brake fluid is applied to both of the axial end surfaces of the first pump casing, wherein each of the axial ends has a larger surface area. Since the second cylinder 71b is firmly fixed to the housing 101, the high pressure of the brake fluid applied to both of the axial end surfaces of the first pump casing is received by a fixing portion between the second cylinder 71b and the housing 101.

Since the brake fluid pressure applied to the axial forward end surface of the first pump casing corresponds to the high pressure of the brake fluid generated at the pump 19, pressure balance between the inside and outside of the first pump casing is maintained at the axial forward end surface of the first pump casing. On the other hand, since the brake fluid pressure applied to the axial backward end surface of the first pump casing corresponds to the high pressure of the brake fluid generated at the pump 39, pressure balance between the inside and outside of the first pump casing is also maintained at the axial backward end surface of the first pump casing. Therefore, it is possible to avoid such a situation that the fluid pressure pushing the first pump casing is too small or on the contrary too large. It is possible to provide the rotary pump device, in which the fluid pressure for pushing the pump body 100 at a proper pressure is generated.

(2) In a case that the high pressure of the brake fluid is only applied to the wheel cylinders 14 and 15 of the first hydraulic circuit 50a, while no pressure of the brake fluid is applied to the wheel cylinders 34 and 35 of the second hydraulic circuit 50b (this is achieved in the same manner to the first embodiment already explained above), the fluid pressure in the first discharge passage 91 communicated to the first outlet port 81 of the rotary pump 19 is increased to the high pressure, while the fluid pressure in the second discharge passage 93 communicated to the second outlet port 83 of the rotary pump 39 is not increased to the high pressure. Since the second cylinder 71b is firmly fixed to the housing 101, the space 94 formed between the third cylinder 71c and the fourth cylinder 71d, which are on a low pressure side, may not be pressed in a direction of decreasing the space 94. And the high pressure of the brake fluid applied to the axial forward end surface of the first pump casing is received by the fixing portion between the second cylinder 71b and the housing 101.

Since the brake fluid pressure applied to the axial forward end surface of the first pump casing corresponds to the high pressure of the brake fluid generated at the pump 19, pressure balance between the inside and outside of the first pump casing is maintained at the axial forward end surface of the first pump casing. On the other hand, since the low pressure of the brake fluid applied to the axial backward end surface of the first pump casing corresponds to the low pressure of the brake fluid on the side of the pump 39, pressure balance between the inside and outside of the first pump casing is also maintained at the axial backward end surface of the first pump casing. Therefore, it is possible to avoid such a situation that the fluid pressure pushing the first pump casing is too small or on the contrary too large. It is possible to provide the rotary pump device, in which the fluid pressure for pushing the pump body 100 at a proper pressure is generated.

(3) In a case that the high pressure of the brake fluid is only applied to the wheel cylinders 34 and 35 of the second hydraulic circuit 50b, while no pressure of the brake fluid is applied to the wheel cylinders 14 and 15 of the first hydraulic circuit 50a (this is achieved in the same manner to the first embodiment already explained above), the fluid pressure in the second discharge passage 93 communicated to the second outlet port 83 of the rotary pump 39 is increased to the high pressure, while the fluid pressure in the first discharge passage 91 communicated to the first outlet port 81 of the rotary pump 19 is not increased to the high pressure. Since the second cylinder 71b is firmly fixed to the housing 101, a space formed between the first cylinder 71a and the bottom surface of the cylindrical recessed portion 101a, which are on a low pressure side, may not be pressed in a direction of decreasing the space. And the high pressure of the brake fluid applied to the axial backward end surface of the first pump casing is received by the fixing portion between the second cylinder 71b and the housing 101.

Since the brake fluid pressure applied to the axial backward end surface of the first pump casing corresponds to the high pressure of the brake fluid generated at the pump 39, pressure balance between the inside and outside of the first pump casing is maintained at the axial, backward end surface of the first pump casing. On the other hand, since the low pressure of the brake fluid applied to the axial forward end surface of the first pump casing corresponds to the low pressure of the brake fluid on the side of the pump 19, pressure balance between the inside and outside of the first pump casing is also maintained at the axial forward end surface of the first pump casing. Therefore, it is possible to avoid such a situation that the fluid pressure pushing the first pump casing is too small or on the contrary too large. It is possible to provide the rotary pump device, in which the fluid pressure for pushing the pump body 100 at a proper pressure is generated.

As above, even with the structure in which the second cylinder 71b is firmly fixed to the housing 101, it is possible to hold the first pump casing at its desired position, even when no spring is provided in the pump device or a spring having only a small spring force is provided in the pump device. In addition, since the pushing force is not generated by the spring, it is possible to provide the rotary pump device, in which the pushing force of the appropriate value can be generated to the pump body 100.

(Third Embodiment)

A third embodiment of the present invention will be explained. According to the third embodiment, the vehicle brake control system (incorporating the rotary pump device) of the first embodiment is used but the first pump casing provided in the pump device is axially moved so as to increase pressure increase response for the wheel cylinder pressure. Since the basic structure for the vehicle brake control system and its pump device are the same to the first embodiment, a different point, that is a control method of the brake control system and the pump device, will be explained.

At an initial checking stage for starting a vehicle engine, a vehicle stopping stage, a stopping stage of the vehicle movement control and so on, an operation for increasing the brake fluid pressure at the wheel cylinders 14 and 15 of only the first hydraulic circuit 50a is carried out (this is achieved in the same manner to the first embodiment already explained above), so that the first pump casing is moved in the backward direction of the insertion (in the right-hand direction in FIG. 2). Then, the brake control ECU 70 carries out the following steps for the vehicle movement, control.

Immediately when the vehicle movement control is started, the second differential pressure control valve 36 as well as the third and fourth pressure increase valves 37 and 38, each of which is provided in the second hydraulic circuit 50b for the rear wheels (shown in FIG. 1), is switched to the non-communication mode. At the same time, the rotary pumps 19 and 39 are operated. The fluid pressure in the fluid passage G of the second hydraulic circuit 50b is increased earlier than the fluid pressure in the fluid passage C of the first hydraulic circuit 50a, because the above mentioned valves 36, 37 and 38 in the second hydraulic circuit 50b are closed. In other words, the fluid pressure in the space 94 formed between the third cylinder 71c and the fourth cylinder 71d is increased earlier than the fluid pressure in the annular passage 81a formed between the first cylinder 71a and the bottom surface of the cylindrical recessed portion 101a. As a result, the first pump casing is moved in the forward direction of the insertion, that is from a backward position (a right-hand position) to a forward position (a left-hand position). Then, the brake fluid pushed out by the movement of the first pump casing is supplied into (added to) the wheel cylinders 14 and 15 of the first hydraulic circuit 50a through the first discharge passage 91.

Figure 5:
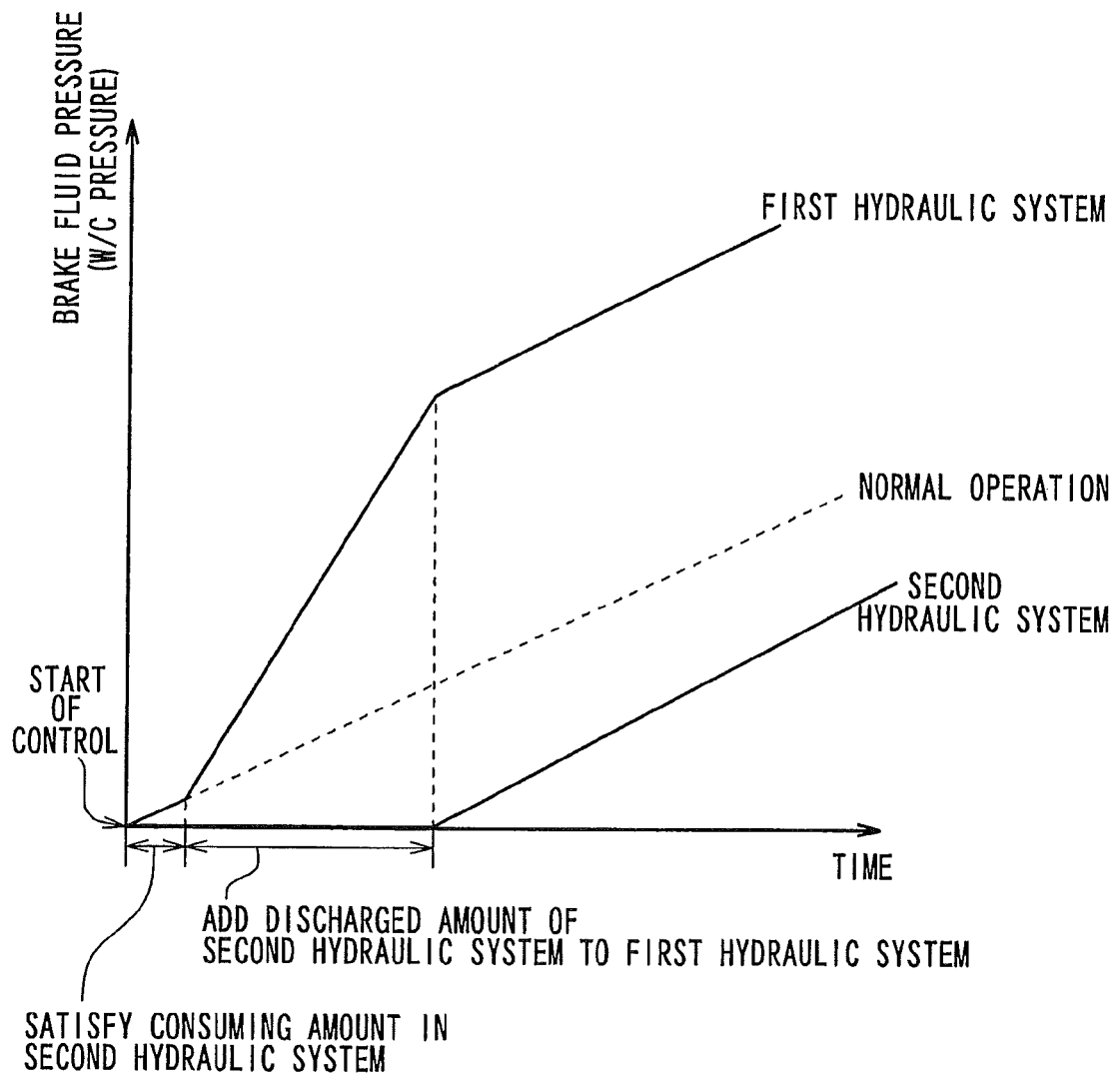
FIG. 5 is a graph showing a change of a brake fluid pressure (W/C pressure) for the purpose of explaining a third embodiment of the present invention.

FIG. 5 is a graph showing a change of the brake fluid pressure (W/C pressure). As shown in FIG. 5, as soon as the brake fluid pumped out from the pump 39 in the second hydraulic circuit 50b reaches at a consuming amount in the second hydraulic circuit 50b (more exactly, brake fluid pipe lines, respectively formed between the control valves 36, 37 and 38 and the pump 39 of the second hydraulic circuit 50b), the first pump casing is moved in the forward direction of the insertion (the left-hand direction), so that the brake fluid pushed out from the pump device by the movement of the first pump casing is added to the brake fluid pumped out from the pump 19 of the first hydraulic circuit 50a. As a result, a pressure increasing slope of the wheel cylinder pressure (W/C pressure) in the first hydraulic circuit 50a is made larger. A pressure increase response for the wheel cylinder pressure (W/C pressure) can be improved for the hydraulic circuit of the front wheels, for which it is desired to increase the braking force earlier.

After the pressure increase response is achieved in the first hydraulic circuit 50a, the second differential pressure control valve 36 as well as the third and fourth pressure increase valves 37 and 38 (each of which is provided in the second hydraulic circuit 50b for the rear wheels) is switched to the communication mode, so that the brake fluid pressure for the wheel cylinders 34 and 35 will be increased.

As explained above, the first pump casing is at first moved to one of axial end positions in the insertion direction thereof, then the first pump casing is moved from the one axial end position to the other axial end position based on a difference of consuming amount of the brake fluid between the first and second hydraulic circuits 50a and 50b. And the pressure increase response for the wheel cylinder pressure in one of the hydraulic circuits can be improved by use of the brake fluid, which is pushed out from the pump device because of the movement of the first pump casing in the pump device.

The pressure increase response for the wheel cylinder pressure can be improved for either one of the front wheel and rear wheel systems. It is, however, more effective when the pressure increase response for the wheel cylinder pressure is improved for the front wheel system, in view of improving a vehicle performance, such as a performance of decreasing the braking distance.

According to the above embodiment, the pressure increase response for, the wheel cylinder pressure is decreased for the rear wheel system. However, even when the pressure increase response for the wheel cylinder pressure is somewhat decreased for the rear wheel system, a higher braking performance can be obtained as a whole by improving the pressure increase response for the wheel cylinder pressure for the front wheel system.

(Fourth Embodiment)

A fourth embodiment of the present invention will be explained. In the above third embodiment, the first pump casing is moved to its backward position in the insertion direction, for example, at the initial checking stage for starting the vehicle engine. According to the fourth embodiment, the first pump casing is mechanically moved to its backward position in the insertion direction. The brake control system as well as the rotary pump device is basically the same to that of the first embodiment. Explanation is made for those portions, which are different from the first embodiment.

Figure 6:
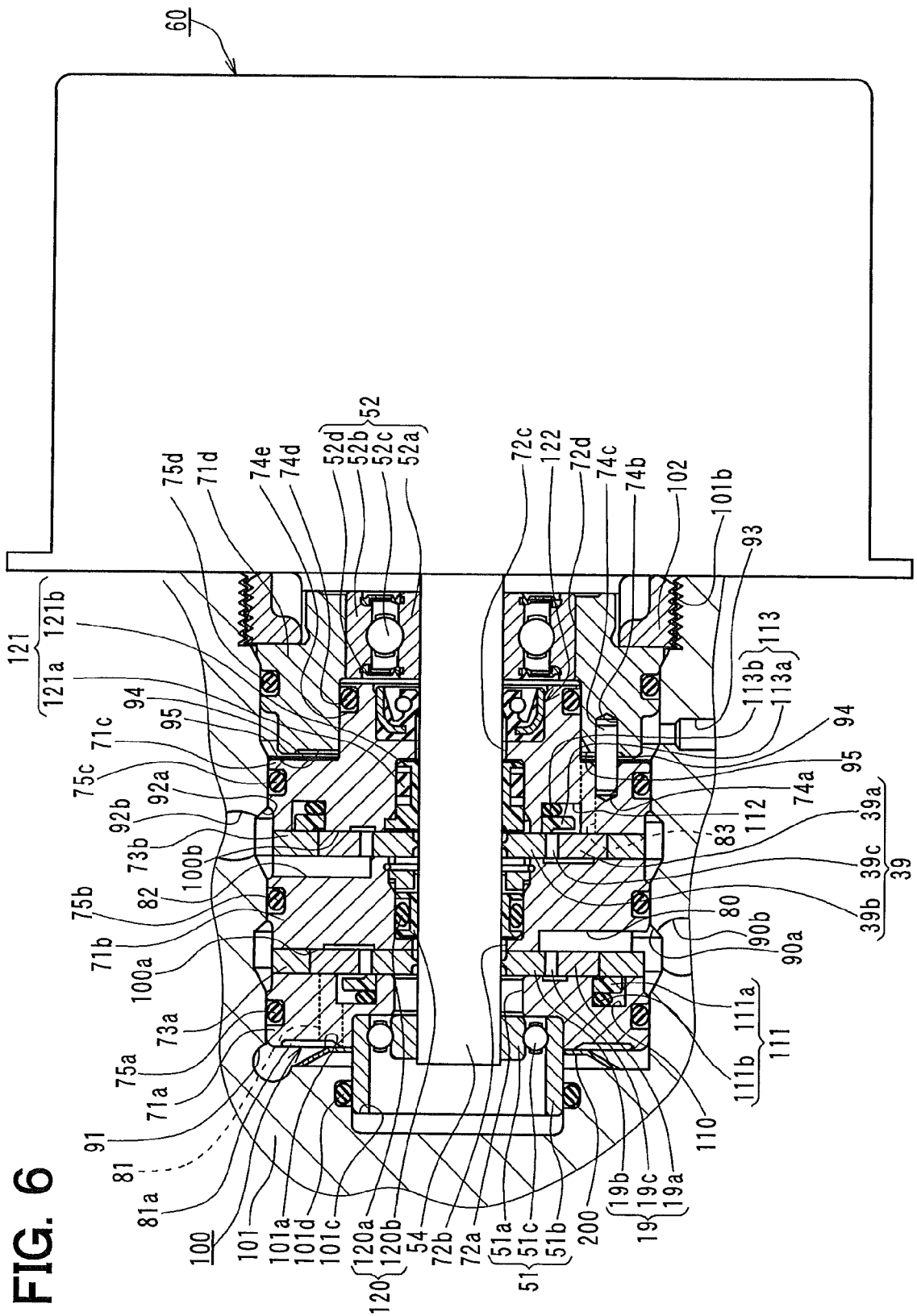
FIG. 6 is a schematic cross sectional view showing a pump body 100 of a rotary pump device, which is incorporated into a vehicle brake control system according to a fourth embodiment of the present invention.

FIG. 6 is a schematic cross sectional view showing a pump body 100 of a rotary pump device, which is incorporated into a vehicle brake control system according to the fourth embodiment of the present invention.

As shown in FIG. 6, a return spring 200 is provided between the first cylinder 71a and the bottom surface of the cylindrical recessed portion 101a, which is different from the pump device shown in FIG. 2. Since the rotary pumps 19 and 39 are biased by an elastic force of the return spring 200 in the backward direction (in the right-hand direction), the first pump casing (which is composed of the first to third cylinders 71a to 71c as well as the first and second center plates 73a and 73b) is automatically moved to its backward position, when the rotary pumps 19 and 39 are not in operation. It is, therefore, not necessary to operate the rotary pumps 19 and 39 as well as the valves 36, 37 and 38, at the initial checking stage for starting a vehicle engine.

In addition, an axial length of a cylindrical sliding surface between the third cylinder 71c and the fourth cylinder 71d, namely an axial length of the small-diameter portion formed in the third cylinder 71c on the right-hand side as well as an axial length of the center through-hole 72d formed in the fourth cylinder 71d (into which the small-diameter portion is inserted in a sliding manner) is made larger than that of the first embodiment. Furthermore, an axial length of the outer ring 51b of the first bearing 51 is made larger than that of the first embodiment. As a result, a volume of the space formed between the first cylinder 71a and the bottom surface of the cylindrical recessed portion 101a as well as a volume of the space 94 formed between the third and fourth cylinders 71c and 71d is made larger than those of the rotary pump device of FIG. 2, so that the amount of the brake fluid, which is used for improving the pressure increase response for the wheel cylinder pressure for the front wheel system, is made larger.

According to the above structure, the same effect to the third embodiment can be obtained. It is also possible to move the first pump casing in the backward direction of the insertion, without operating the rotary pumps 19 and 39 as well as the valves 36, 37 and 38 at the initial checking stage for starting the vehicle engine.

In addition, since it is possible to increase the amount of the brake fluid to be used for improving the pressure increase response for the wheel cylinder pressure for the front wheel system, the pressure increase response can be further improved.

(Other Embodiments)

In the above embodiments, the third and fourth pressure increase valves 37 and 38 of the second hydraulic circuit 50b for the rear wheel system are explained as electromagnetic valves of a normally-open type. The third and fourth pressure increase valves 37 and 38 for the third and fourth embodiments may be formed by differential pressure control valves. Then, it is also possible to adjust the wheel cylinder pressure for the second hydraulic circuit 50b.

In the above fourth embodiment, the structure for increasing the brake fluid amount so as to increase the pressure increase response is applied to the rotary pump device, in which the return spring 200 is provided. However, the above structure for increasing the brake fluid amount for increasing the pressure increase response can be also applied to such a rotary pump device, in which no return spring is provided, such as the pump device for the third embodiment.

In each of the above embodiments, the pump 19 for the first hydraulic circuit 50a is provided at a front side in the insertion direction, while the pump 39 for the second hydraulic circuit 50b is provided at a back-side in the insertion direction. The pumps 19 and 39 may be reversed in the insertion direction.

Furthermore, in each of the above embodiments, the rotary pump device according to the present invention is applied to the vehicle brake control system. However, the rotary pump device may be applied to other systems, in which two rotary pumps are provided to draw and discharge working fluid in each of independent hydraulic systems.

In addition, in each of the above embodiments, the outlet ports 81 and 83 are opened at each axial end surface of the first pump casing. The present invention may be applied to such a structure, in which outlet ports are provided in the housing, the brake fluid is discharged from an outer peripheral portion into the outlet ports, and high pressure of the brake fluid may be applied to both of the axial end surfaces of the first pump casing through the housing.

What is claimed is:

1. A rotary pump device comprising:
    a housing having a cylindrical recessed portion;
    a pump body inserted into the cylindrical recessed portion and having;
        a cylindrical first pump casing;
        a first rotor chamber and a second rotor chamber, each of which is formed in the first pump casing for respectively accommodating a first rotary pump and a second rotary pump, each of the first and second rotary pumps being composed of an internal gear pump for drawing and pumping out working fluid;
        a driving shaft inserted through the first and second rotary pumps for driving the first and second rotary pumps, wherein the first rotary pump is arranged around the driving shaft on a side to an axial forward end thereof, while the second rotary pump is arranged around the driving shaft on a side to an axial backward end thereof;
        a first inlet port and a first outlet port, each of which is formed in the first pump casing and communicated with the first rotor chamber;
        a second inlet port and a second outlet port, each of which is formed in the first pump casing and communicated with the second rotor chamber; and
        a second pump casing provided around the driving shaft so that the second pump casing is coaxially arranged with the first pump casing and arranged at the side to the axial backward end of the driving shaft;
    an electric motor attached to the housing and for rotating the driving shaft;
    a first axial space formed in the cylindrical recessed portion of the housing and defined by a bottom surface of the cylindrical recessed portion and an axial forward end surface of the first pump casing that faces the bottom surface, wherein the first outlet port is opened to the first axial space so that discharge pressure of the working fluid from the first rotary pump is applied to the first axial space to press the axial forward end surface of the first pump casing toward the second pump casing; and
    a second axial space formed in the cylindrical recessed portion of the housing and defined by an axial backward end surface of the first pump casing and an axial forward end surface of the second pump casing that faces the axial backward end surface of the first pump casing, wherein the second outlet port is opened to the second axial space so that discharge pressure of the working fluid from the second rotary pump is applied to the second axial space to press the axial backward end surface of the first pump casing toward the bottom surface of the cylindrical recessed portion.

2. The rotary pump device according to the claim 1, wherein the first pump casing is movable in a direction of inserting the first pump casing into the cylindrical recessed portion, based on fluid pressure applied to the axial forward end surface of the first pump casing and fluid pressure applied to the axial backward end surface of the first pump casing.

3. The rotary pump device according to the claim 1, wherein a discharge timing of the working fluid of the first rotary pump is displaced from that of the working fluid of the second rotary pump by 180 degrees.

4. The rotary pump device according to the claim 1, wherein the first pump casing comprises:
    a first cylinder, having a first center through-hole, through which the driving shaft is, inserted;
    a first center plate arranged next to the first cylinder and for accommodating the first rotary pump;
    a second cylinder arranged next to the first center plate and having a second center through-hole, through which the driving shaft Is inserted;
    a second center plate arranged next to the second cylinder and for accommodating the second rotary pump; and
    a third cylinder arranged next to the second center plate and having a third center through-hole, through which the driving shaft is inserted,
    wherein the second cylinder is inserted into the cylindrical recessed portion of the housing and firmly fixed to the housing.

* * * * *